United States Patent
Povroznik, III et al.

(10) Patent No.: US 10,071,493 B2
(45) Date of Patent: Sep. 11, 2018

(54) TRIGGERING SYSTEMS FOR CARTRIDGE ACTIVATED DEVICES

(71) Applicant: Sikorsky Aircraft Corporation, Stratford, CT (US)

(72) Inventors: Stephen B. Povroznik, III, Milford, CT (US); Darryl A. Tetrault, Wallingford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 208 days.

(21) Appl. No.: 15/147,727

(22) Filed: May 5, 2016

(65) Prior Publication Data

US 2016/0325454 A1 Nov. 10, 2016

Related U.S. Application Data

(60) Provisional application No. 62/158,723, filed on May 8, 2015.

(51) Int. Cl.
*B26D 5/08* (2006.01)
*B64D 1/22* (2006.01)
*B66D 1/54* (2006.01)
*B64C 1/32* (2006.01)
*B64G 1/64* (2006.01)

(52) U.S. Cl.
CPC ............ *B26D 5/086* (2013.01); *B64C 1/32* (2013.01); *B64D 1/22* (2013.01); *B64G 1/645* (2013.01); *B66D 1/54* (2013.01); *Y10T 83/8863* (2015.04)

(58) Field of Classification Search
CPC .. B26D 5/086; B64C 1/32; B64D 1/22; B64G 1/645; B66D 1/54
USPC ................... 102/206, 262; 304/104
See application file for complete search history.

(56) References Cited

U.S. PATENT DOCUMENTS

| 3,810,671 A | 5/1974 | Jeffery |
| 4,049,482 A | 9/1977 | Webb |
| 4,826,103 A * | 5/1989 | McKown ............. B64C 27/006 114/221 A |
| 2004/0231545 A1 * | 11/2004 | Lloyd ..................... F42C 21/00 102/202.5 |
| 2011/0234139 A1 * | 9/2011 | Hsu .......................... H02P 1/26 318/497 |

* cited by examiner

*Primary Examiner* — Kenneth E. Peterson
*Assistant Examiner* — Liang Dong
(74) *Attorney, Agent, or Firm* — Cantor Colburn LLP

(57) ABSTRACT

A triggering system includes a source lead, a ground lead, primary and secondary actuation circuits, and a serializing switch. Both the primary and second actuation circuits are connected to the source lead and the serializing switch has first and second positions. In a first position, the serializing switch connects the primary and secondary actuation circuit in parallel for actuating primary and secondary cartridge activated devices. In a second position, the serializing switch connects the secondary actuation circuit in series with the primary actuation circuit for verifying that the actuation circuits can reliably actuate both cartridge activated devices.

5 Claims, 6 Drawing Sheets

TRIGGERING SYSTEMS FOR CARTRIDGE ACTIVATED DEVICES

CROSS-REFERENCE TO RELATED APPLICATION

This application claims the benefit of priority under 35 U.S.C. § 119(e) to U.S. Provisional Application No. 62/158,723, filed May 8, 2015, which is incorporated herein by reference in its entirety.

BACKGROUND OF THE INVENTION

1. Field of the Invention

The present disclosure relates to triggering systems, and more particularly, to triggering systems for cartridge activated devices used in vehicles such as aircraft.

2. Description of Related Art

Cartridges and cartridge-actuated devices are self-contained energy sources commonly used to do mechanical work. Upon actuation, typically by operation of a trigger, such devices will generate force by burning a propellant or pyrotechnic material to produce high-pressure combustion products. The high-pressure combustion products exert force on a movable object, such as a piston, and displacing the movable object. The devices can be relatively small and compact, making such cartridge activated devices attractive in settings where space or weight is limited, and generally can respond rapidly to actuation, making cartridge activated devices suitable for both military and non-military applications.

Examples of military applications include emergency jettison systems, such as canopy and/or cabin door release systems for aircraft as well as missile stage separators. Examples of non-military applications include bolt installation devices for masonry and vehicular passive restraint devices (e.g. airbags). In some applications, it can be desirable (or necessary for certification purposes) to periodically verify that the trigger is available for reliable operation in the event that actuation of the cartridge-activated device is necessary.

Such conventional methods and systems have generally been considered satisfactory for their intended purpose. However, there is still a need in the art for improved cartridge-actuated device triggering systems. The present disclosure fulfills this need.

SUMMARY OF THE INVENTION

A new and useful triggering system is disclosed that includes a source lead, a ground lead, primary and secondary actuation circuits, and a serializing switch. Both the primary and second actuation circuits are connected to the source lead and the serializing switch has first and second positions. In the first position the switch connects the primary and secondary actuation circuit in parallel with one another. In the second position, the switch connects the secondary actuation circuit in series with the primary actuation circuit.

In certain embodiments, the serializing switch can couple a return lead of the secondary actuation circuit directly to the ground lead in the first position, and can couple the secondary actuation circuit return lead to a test circuit in the second position. The serializing switch can be a first serializing switch, and the triggering system can include second and third serializing switches. The second serializing switch can couple a return lead of the primary actuation circuit directly to ground in the first position, and the primary actuation circuit return lead to an input lead of the secondary actuation circuit in the second position. The third serializing switch can couple the source lead to an input lead of the secondary actuation circuit in the first position, and a return lead of the primary actuation circuit with an input lead of the secondary actuation circuit in the second position. It is contemplated that a test relay having energized and de-energized states can house the serializing switch for arranging the switch in the first position when energized and in the second position when de-energized.

In accordance with certain embodiments, the triggering system can include a fire switch with first and second positions. The fire switch can connect the source lead to a primary actuation circuit input lead in the first position and the source lead to the ground lead in the second position. The fire switch can be a first fire switch, and the triggering system can include a second fire switch. The second fire switch can connect the secondary actuation circuit input lead with the serializing switch in the first position, and can connect the secondary actuation circuit input lead with the ground lead in the second position. A fire relay can house the first and second fire switches, the fire relay arranging the switches in their first position when energized in in their second when de-energized.

In accordance with certain embodiments, the triggering system can include an indicated arm switch. The switch can be cooperative with a shear switch to apply power to the source lead and energize the fire relay. An indicated test circuit can be coupled to the secondary actuation circuit by the serializing switch. A test circuit can be connected in series with the secondary actuation return lead by the serializing switch. An indicated test switch can be configured to energize the test relay by electrically connecting the test relay with the source lead.

A hoist includes a cable, a cutter coupled to the cable, and a triggering system as described above operatively associated with the cutter. The cutter includes primary and secondary cartridges, and the primary actuation circuit is operatively coupled to the primary cartridge and the secondary actuation circuit is operatively coupled to the secondary cartridge.

In certain embodiments, the hoist can be operatively mounted to a rotorcraft winching station. The cutter can include a primary cartridge-activated device for severing the cable using mechanical energy generated by activation of the primary cartridge. The cutter can also include a secondary cartridge-activated device for severing the cable using mechanical energy generated by activation of the secondary cartridge.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
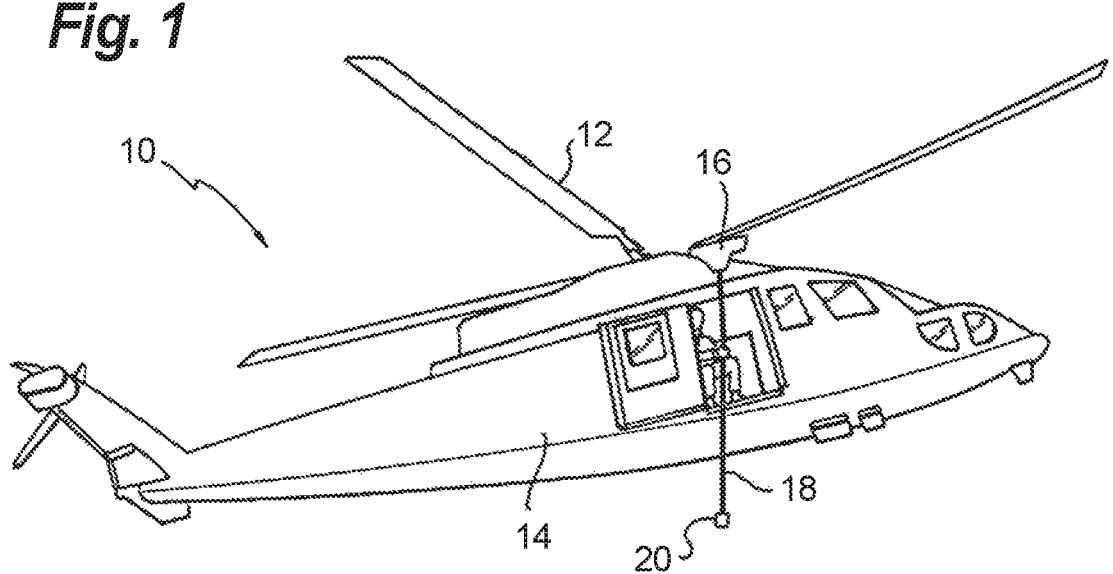
FIG. 1 is a side elevation view of a rotorcraft mounting an exemplary embodiment of a hoist, showing a hoist cable deployed from a hoist mounted on the rotorcraft.

Reference will now be made to the drawings wherein like reference numerals identify similar structural features or aspects of the subject disclosure. For purposes of explanation and illustration, but not limitation, an exemplary embodiment of a rotorcraft 10 having a cable, cable cutter, and triggering system as described herein, is shown in FIG. 1 and is designated generally by reference numeral 10. Other embodiments in accordance with the disclosure, or aspects thereof, are provided in FIGS. 2-7, as will be described. The systems and methods described herein can be used for testing and triggering cartridge-activated cable cutters for rotorcraft hoists.

Referring to FIG. 1, rotorcraft 10 includes a rotor disk 12 and an airframe 14 mounting a hoist assembly 16. Hoist assembly 16 includes a cable 18 configured to be deployed from and recovered to a reel (not shown for clarity reasons) operatively disposed within hoist assembly 16. A hook 20 is connected on an end of cable 18 opposite the reel for purposes of winching objects and/or personnel into and out of rotorcraft 10 during winching operations. Examples of hoists include Model 76379-040 available from UTC Aerospace Systems of Windsor Locks, Conn. Although a particular type of rotorcraft aircraft configuration is illustrated in the disclosed embodiment, other types of aircraft will also benefit from the present disclosure such as compound rotary wing aircraft, turbo-props, flying cranes, tilt-rotors, and tilt-wing aircraft by way of non-limiting examples. Furthermore, the particular mounting location of hoist assembly 16 could vary depending upon the configuration of the aircraft mounting hoist assembly 16.

Figure 2:
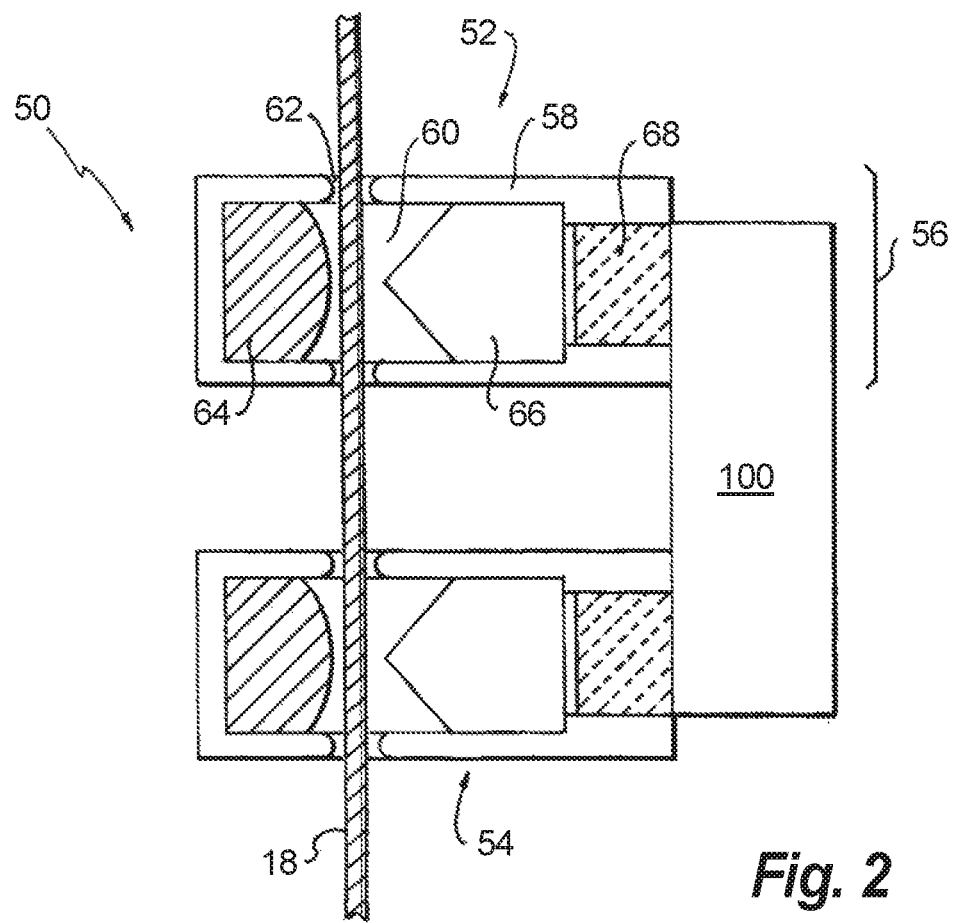
FIG. 2 is a schematic view of a cable cutter coupled to the hoist cable of FIG. 1, showing a triggering system coupled with primary and secondary cartridge activated devices (CAD) of the cable cutter.

With reference to FIG. 2, a cable cutter 50 is shown. Cable cutter 50 includes a primary cutter 52, a secondary cutter 54, and a triggering system 100. Primary cutter 52 is coupled to cable 18 at a first location along a length of cable 18 and secondary cutter 54 is coupled at a second location along the length of cable 18. Triggering system 100 is coupled to cable cutter 50 and is operatively associated with both primary cutter 52 and secondary cutter 54. Upon activation, triggering system 100 actuates both primary cutter 52 and secondary cutter 54 and redundantly sever cable 18 at two separate locations.

Primary cutter 52 includes a cartridge-activated device (CAD) 56 having a pressure housing 58. Pressure housing 58 defines a bore 60 and an aperture 62 coupling the environment external to bore 60 therewith. Cable 18 extends through aperture 62 and through bore 60 such that a portion of the cable length is disposed between an anvil 64 and a hammer 66. A gas generator 68 is disposed on a side of hammer 66 opposite both cable 18 and anvil 64. Upon actuation by triggering system 100, gas generated by gas generator 68 expands with sufficient force to drive hammer 66 into anvil 64 and sever cable 18. Secondary cutter 54 is similar in construction and operation to primary cutter 52. In embodiments, it is contemplated that triggering system 100 activate CADs operatively associated with both primary cutter 52 and secondary cutter 54 simultaneously.

In certain applications it can be necessary to demonstrate on an ad hoc basis that the triggering system associated with redundant CADs can reliably activate each CAD. For example, a functional hazard assessment for civil rotorcraft mounting cable cutter 50 and triggering system 100 by the Federal Aviation Administration deems a latent inability to sever cable 18 a "major" hazard, and that the quantitative probability of failure of triggering system 100 be less than one in a hundred thousand. One way to achieve such reliability is to incorporate into triggering system 100 point-to-point testing of circuitry disposed therein.

Figure 3:
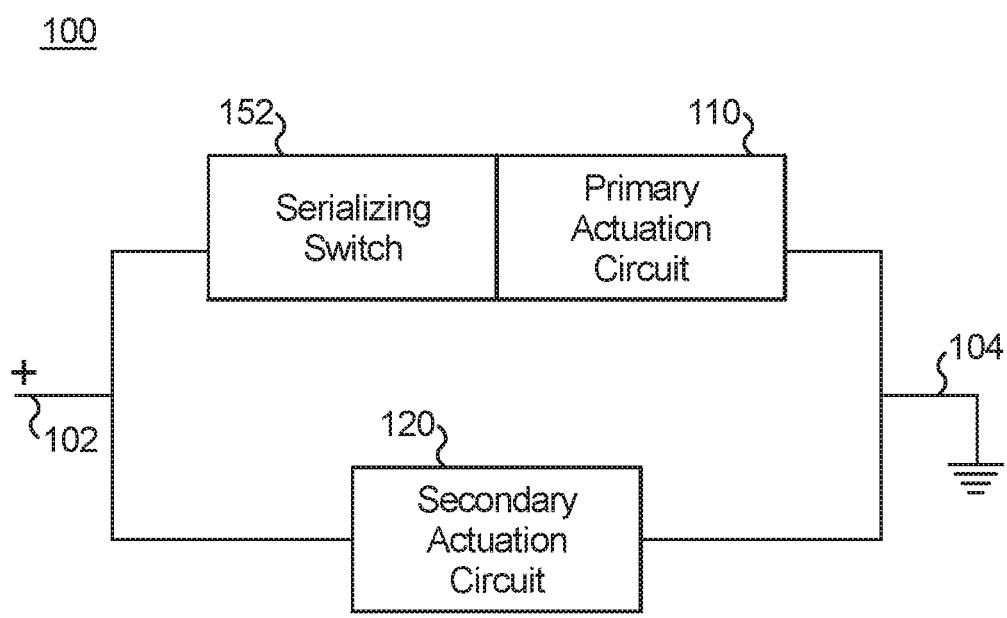
FIG. 3 is block diagram of the triggering system of FIG. 2, showing primary and secondary actuation circuits arranged in parallel with one another for actuating the CADs.
Figure 4:
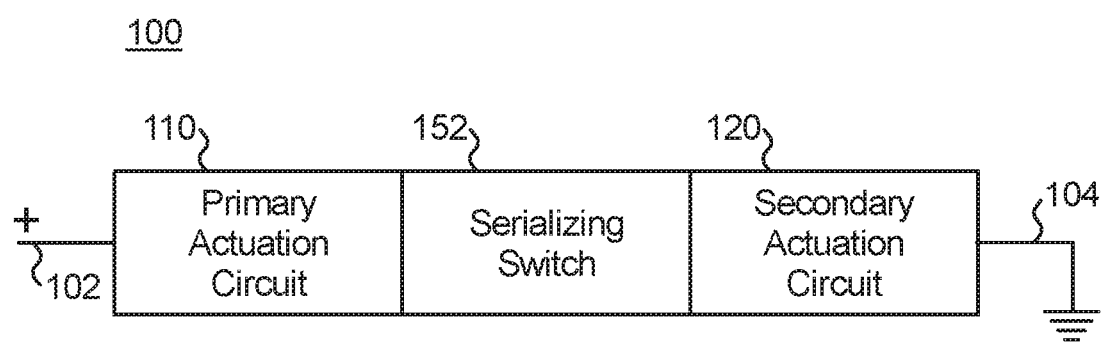
FIG. 4 is block diagram of the triggering system of FIG. 2, showing the primary and secondary actuation circuits arranged in series with one another for testing the circuits.

With reference to FIGS. 3 and 4, triggering system 100 is shown. In the illustrated exemplary embodiment, triggering system 100 is shown as an analog circuit. It is contemplated that, in certain embodiments, triggering system 100 includes digital circuitry and/or software.

Triggering system 100 includes a source lead 102, a ground lead 104, a primary actuation circuit 110, a secondary actuation circuit 120, and a first serializing switch 152. Primary actuation circuit 110, secondary actuation circuit 120, and first serializing switch 152 are arranged between source lead 102 and ground lead 104. First serializing switch 152 has a first and second switch position. In the first position, first serializing switch 152 connects primary actuation circuit 110 and secondary actuation circuit 120 in parallel with one another between source lead 102 and ground lead 104. This enables both CADs operatively associated with the circuits. In the second position (illustrated in FIG. 4), first serializing switch 152 connects primary actuation circuit 110 in series with secondary actuation circuit 120 between source lead 102 and ground lead 104 for testing both actuation circuits.

Figure 5:
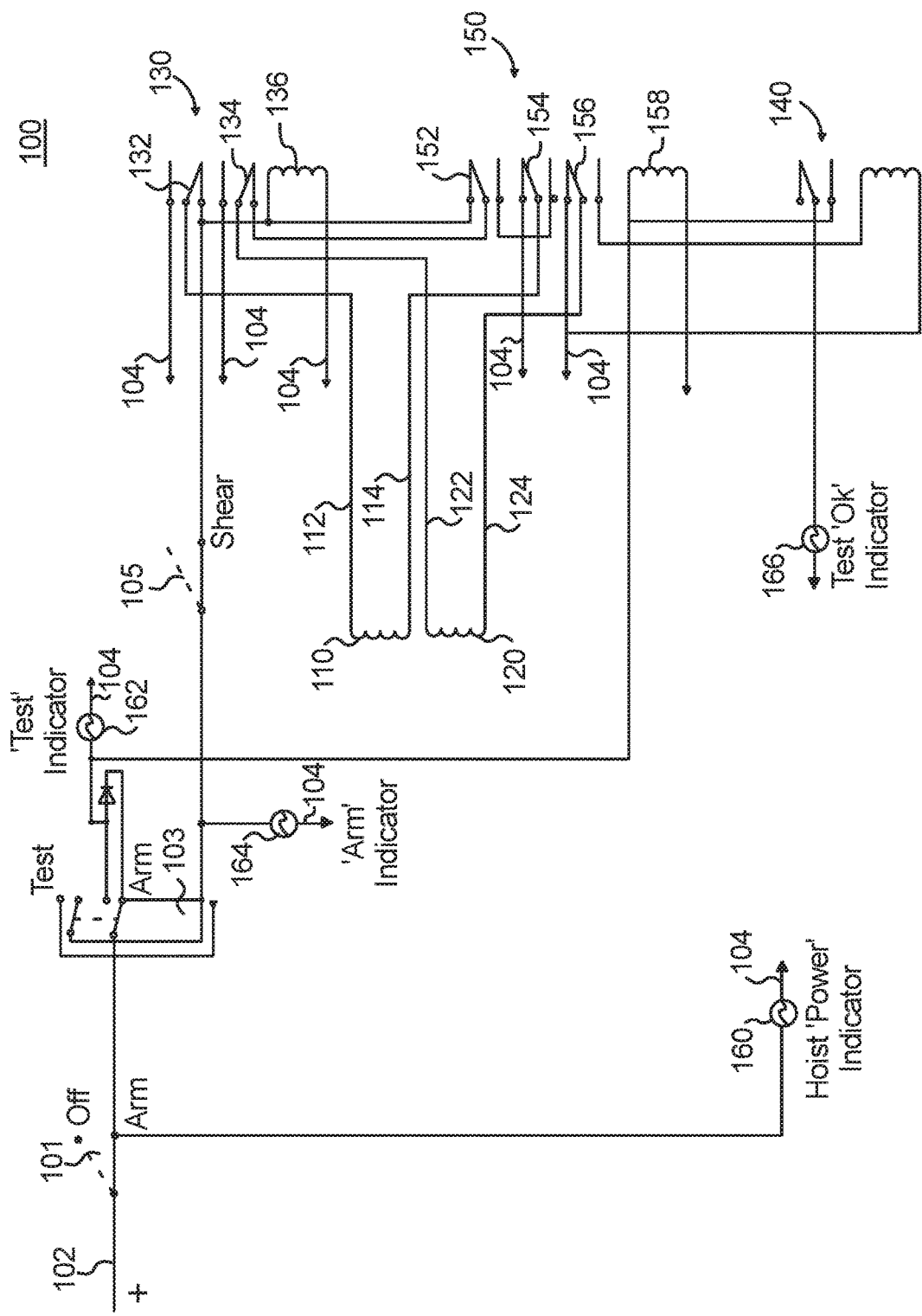
FIG. 5 is a circuit diagram of the triggering system of FIG. 2, showing serializing switch positions for actuating CADs using the primary and secondary actuation circuits.

Referring now to FIG. 5, triggering system 100 is shown with primary actuation circuit 110 arranged in parallel with secondary actuation circuit 120. Triggering system 100 includes a power switch 101, a test switch 103 and a shear switch 105, each with closed and open positions and arranged between source lead 102 and ground lead 104. Triggering system 100 also includes a fire relay 130 and a test relay 150 with energized and de-energized states and arranged between shear switch 105 and ground lead 104. An evaluation relay 140 is further included between both test switch 103 and test relay 150 and ground lead 104. Primary actuation circuit 110 and secondary actuation circuit 120 are also arranged between shear switch 105 and ground lead 104.

Fire relay 130 includes a first fire relay switch 132, a second fire relay switch 134, and a contactor 136. First fire relay switch 132 and second fire relay switch 134 have first and second switch positions and contactor 136 has a de-energized state and an energized state. When contactor 136 is de-energized, first fire relay switch 132 and second fire relay switch 134 move to their second switch positions. This connects an input lead 112 of primary actuation circuit 110 to ground lead 104 through first fire relay switch 132. It also connects an input lead 122 of secondary actuation circuit 120 to ground lead 104 through second fire relay switch 134.

When contactor 136 is energized, first fire relay switch 132 and second fire relay switch move to their first switch positions (e.g., as illustrated in FIG. 5). This connects shear switch 105 to primary actuation circuit input lead 112 through first fire relay switch 132. It also connects shear switch 105 to secondary actuation circuit input lead 122 through second fire relay switch 134.

Test relay 150 includes a first serializing switch 152, a second serializing switch 154, a third serializing switch 156, and a contactor 158. First serializing switch 152, second serializing switch 154 and third serializing switch 156 each have first and second switch positions. Contactor 158 has a de-energized state and an energized state. When contactor 158 is de-energized, each of first serializing switch 152, second serializing switch 154 and third serializing switch 156 move to their respective first position (see FIG. 5). This connects secondary actuation circuit 120 to shear switch 105 through first serializing switch 152. It also connects a primary actuation circuit return lead 114 to ground lead 104 through second serializing switch 154. Additionally, it further connects a secondary actuation circuit return lead 124 to ground lead 104 through third serializing switch 156.

Closing power switch 101 connects shear switch 105 with source lead 102. This applies a voltage potential across shear switch 105 irrespective of the position of test switch 103. It also causes a hoist "POWER" indicator 160 to illuminate, indicating that power has been applied to triggering system 100, such as in the aircraft cockpit or on an operator panel for the hoist assembly.

Positioning test switch 103 to "ARM" removes current from contactor 158. This de-energizes test relay 150 and causes each of first serializing switch 152, second serializing switch 154, and third serializing switch 156 to move to their first positions (shown in FIG. 5) and configures triggering system 100 for actuating the CADs of cable cutter 50 (shown in FIG. 2). It also causes an "ARM" indicator 164 to illuminate in the aircraft cockpit or on an operator panel for the hoist assembly, indicating that triggering system 100 is configured for actuating the CADs associated with triggering system 100.

Closing shear switch 105 causes current to flow through contactor 136 and energizes fire relay 130. Energizing fire relay 130 moves first fire relay switch 132 and second fire relay switch 134 to their first positions (shown in FIG. 5) and allows current to flow from source lead 102 to ground lead 104 through both primary actuation circuit 110 and secondary actuation circuit 120 in parallel with one another. This actuates the primary cutter 52 (shown in FIG. 2) and secondary cutter 54 (shown in FIG. 2), cutting cable 18 (shown in FIG. 2).

Figure 6:
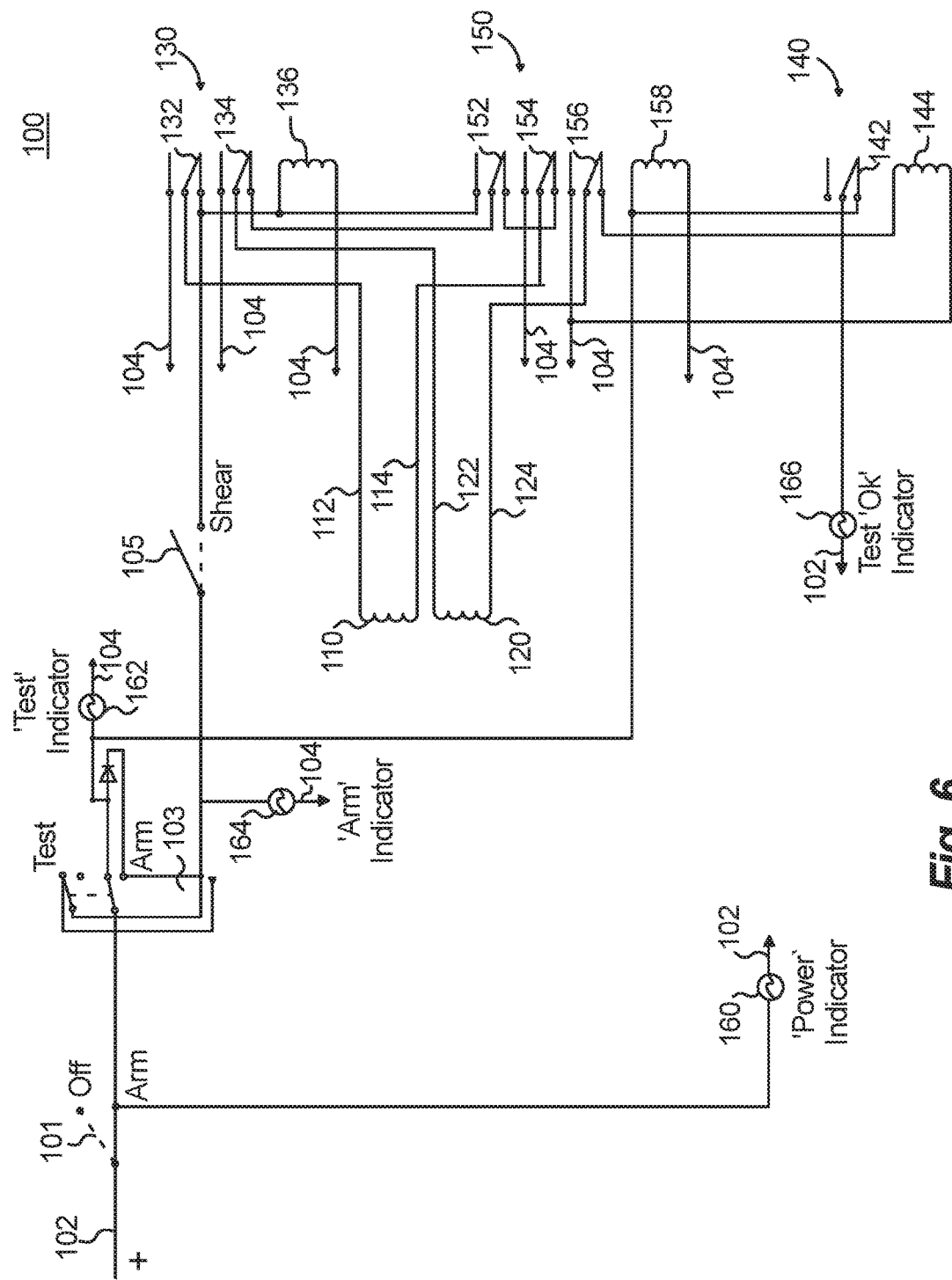
FIG. 6 is a circuit diagram of the triggering system of FIG. 2, showing serializing switch positions for testing the primary and secondary actuation circuits.

With reference to FIG. 6, triggering system 100 is shown with secondary actuation circuit 120 connected in series with primary actuation circuit 110. An evaluation relay 140 is connected to test switch 103 and secondary actuation circuit 120. Evaluation relay includes an evaluation relay switch 142 and an evaluation relay contactor 144. Evaluation relay contactor 144 has an energized state and a de-energized state, and is connected between secondary actuation circuit input lead 122 and ground lead 104. When energized, evaluation contactor 144 moves evaluation relay switch 142 into a first position wherein evaluation relay switch 142 connects test switch 103 with a test OK indicator 166. When de-energized (or insufficiently energized), evaluation relay switch 142 moves to its second position wherein test switch 103 is not connected to ground through evaluation relay switch 142.

Positioning test switch 103 in the "TEST" position causes "TEST" indicator 162 to illuminate in the rotorcraft cockpit or on an operator panel for the hoist assembly, indicating that triggering system 100 is in a test configuration. Current also flows through contactor 158, energizing evaluation relay 140 and moving each of first serializing switch 152, second serializing switch 154, and third serializing switch 156 to their second switch positions.

When shear switch 105 closes with test switch 103 in the "TEST position, current flows through serially connected primary actuation circuit 110 and secondary actuation circuit 120 to contactor 144 of evaluation relay 140 through third serializing switch 156. In the event that the current flow is above a predetermined level, evaluation relay 140 energizes and evaluation relay switch 142 closes. This allows current to flow from test switch 103 (and source lead 102) to ground lead 104 through test "OK" indicator 166 and causes test "OK" indicator 166 to illuminate in the cockpit or on an operator interface coupled to the hoist assembly, thereby indicating that triggering system 100 has passed its point-to-point conductivity test. Passing the point-to-point reliability test indicates that the hoist cable severing system is sufficiently reliable for dispatch of the rotorcraft mounting the system. As will be appreciated, failure of test "OK" indicator 166 to illuminate upon closure of test switch 103 and shear switch 105 when power is applied to hoist assembly 16 (shown in FIG. 1) indicates that triggering system 100 may not reliably cut the hoist cable in two locations, and that troubleshooting may be required.

Figure 7:
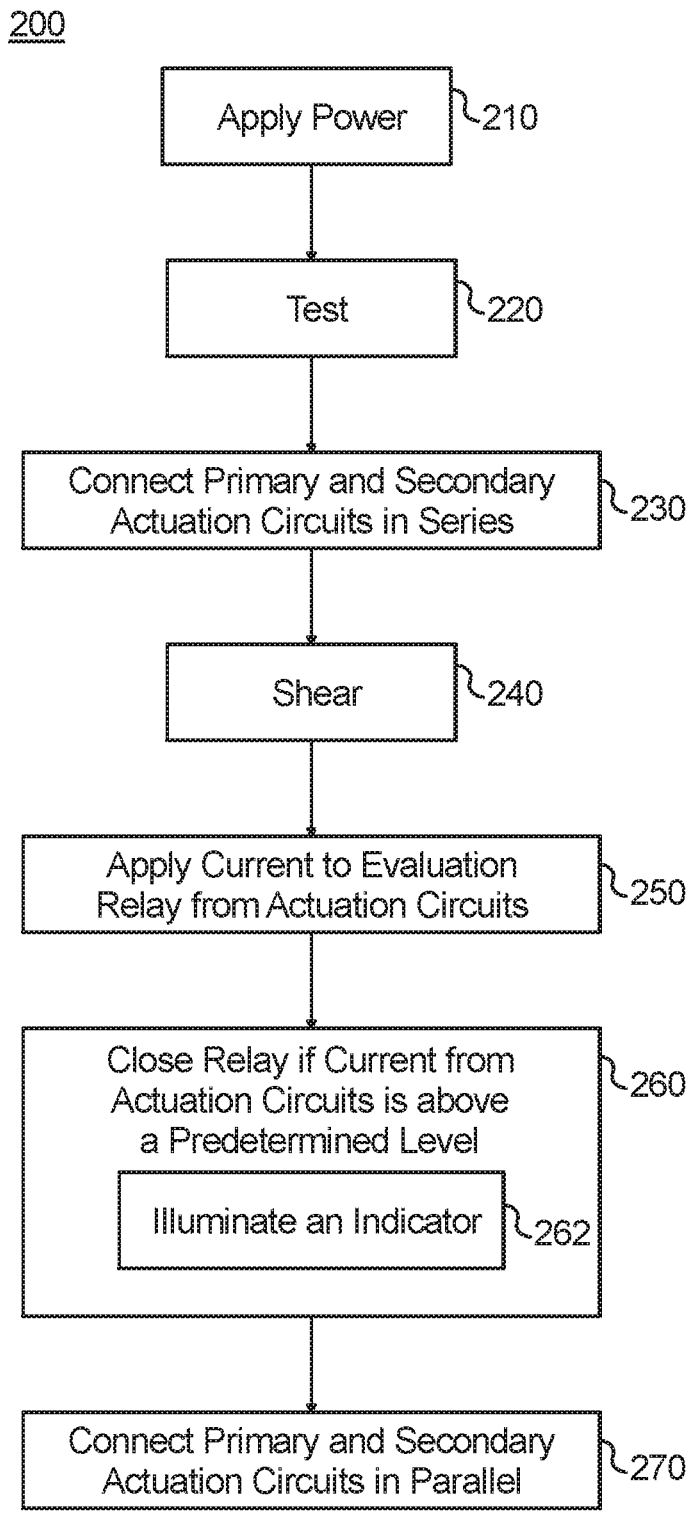
FIG. 7 is a method for testing the triggering system of FIG. 2.

Referring to FIG. 7, a method 200 of testing a CAD triggering system is shown. Method 200 includes applying power to a triggering system, e.g. triggering system 100, at a step 210. Method 200 also includes arming the triggering system, such as with a manual arm switch, e.g. test switch 103, and/or with a weight on wheels switch at a step 220. Method 200 further includes connecting primary and secondary CAD actuation circuits in series with one another, e.g. primary actuation circuit 110 and secondary actuation circuit 120, at a step 230. It is contemplated that the connecting can include reconfiguring the triggering system from a normal configuration wherein the actuation circuits are connected in parallel with one another between ground leads (or terminals).

Upon receipt of a current flow, e.g. by closure of a shear switch at a step 240, method 200 additionally includes flowing current through the serially connected actuation circuits and to an evaluation relay, e.g. evaluation relay 140, at a step 250. In the event that current flow received at the evaluation relay is above a predetermined value, method 200 includes energizing the evaluation relay and connecting a switch of the relay to ground at a step 260. This can also include indicating a test indicator, e.g. "TEST" indicator 162, at a step 262. Once the test is complete, the triggering circuit can be returned to the parallel configuration, such as by de-energizing a test relay, e.g. evaluation relay 140, at a step 270.

In embodiments described herein triggering system 100 includes an indicated power switch 101 that illuminates when power is applied to triggering system 100. In certain embodiments, triggering system 100 applies ground to respective input and return leads of both primary actuation circuit 110 and secondary actuation circuit 120, thereby rendering the circuits less susceptible to ground bus potential changes when power is not applied and when test switch 103 is closed. It is further contemplated that the test functionality can be tied to a weight-on-wheels sensor output to limit testing to operational conditions where the aircraft is on the ground.

The methods and systems of the present disclosure, as described above and shown in the drawings, provide for hoist systems with superior properties including test capability for redundant CAD actuation circuits. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A hoist system, comprising:
   a cable;
   a cable cutter including primary and secondary cartridges coupled to the cable;
   a triggering system operatively associated with the cutter, including:
      a primary actuation circuit operatively coupled to the primary cartridge;
      a secondary actuation circuit operatively coupled to the secondary cartridge; and
      a serializing switch with actuate and test switch positions operably arranged between the primary actuation circuit and the second actuation circuit, wherein the serializing switch connects the first and second actuation circuits in parallel with one another in the actuate position, wherein the serializing switch connects the first and second actuation circuits in series with one another in the test position.

2. A hoist system as recited in claim 1, wherein the primary actuation circuit and the second actuation circuit each include an input lead and a return lead, wherein the serialization switch connects the primary actuation circuit return lead with the secondary actuation circuit input lead in the test position.

3. A hoist system as recited in claim 2, wherein the serialization switch is a first serialization switch and further including a second serialization switch, wherein the second serialization switch has actuate and test positions, wherein the second serialization switch connects the primary actuation circuit with the first serialization switch in the test position.

4. A hoist system as recited in claim 3, further including a third serialization switch with test and actuate positions, wherein the third serialization switch connects the secondary actuation circuit with a ground lead in both the test and actuate switch positions.

5. A hoist system as recited in claim 1, further including a fire relay connected between a source lead and the primary and secondary actuation circuits.

* * * * *